No. 12,809.
REISSUED JUNE 9, 1908.
H. C. MILLER.
DIE FOR FORMING COLLARS.
APPLICATION FILED APR. 25, 1906.
2 SHEETS—SHEET 1.
Fig. 1.
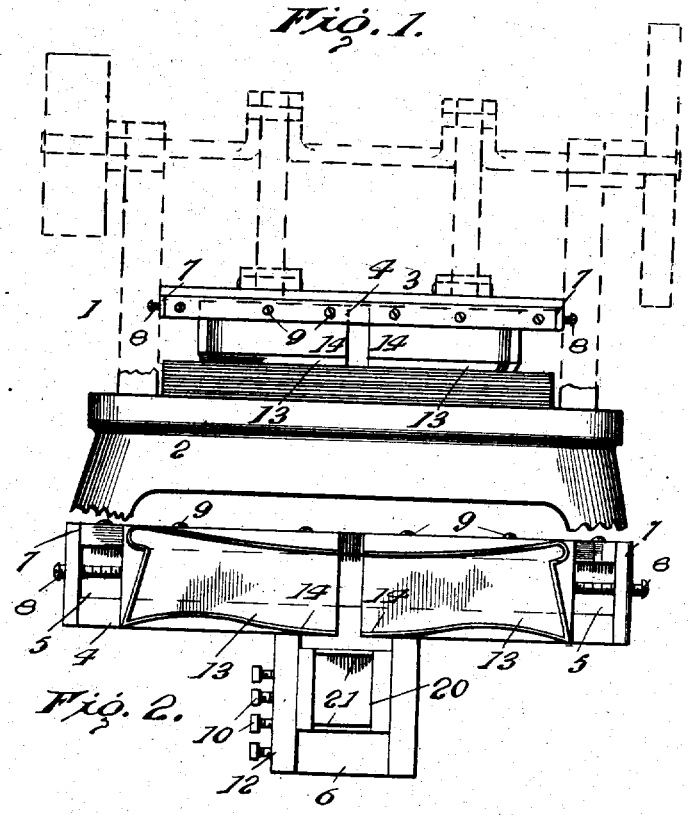
Fig. 2.
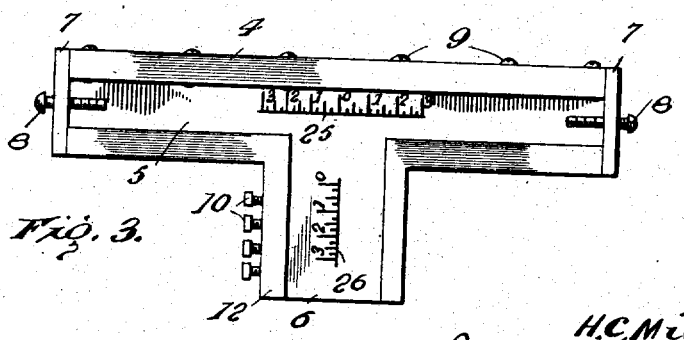
Fig. 3.
Witnesses
E. Bradley.
Floyd Conwall
Inventor
H. C. Miller
By Jno. Smith
Attorney
THE NORRIS PETERS CO., WASHINGTON, D. C.

No. 12,809. REISSUED JUNE 9, 1908.

H. C. MILLER.

DIE FOR FORMING COLLARS.

APPLICATION FILED APR. 25, 1906.

2 SHEETS—SHEET 2.

Witnesses
E. Bradley
Floyd Cornwall

Inventor
H. C. Miller
By
Jno. Munie
Attorney

THE NORRIS PETERS CO., WASHINGTON, D. C.

UNITED STATES PATENT OFFICE.

HENRY C. MILLER, OF WATERFORD, NEW YORK.

DIE FOR FORMING COLLARS.

No. 12,809. Specification of Reissued Letters Patent. Reissued June 9, 1908.

Original No. 793,011, dated June 20, 1905, Serial No. 220,571. Application for reissue filed April 25, 1906. Serial No. 313,719.

*To all whom it may concern:*

Be it known that I, HENRY C. MILLER, a citizen of the United States, residing at Waterford, in the county of Saratoga and State of New York, have invented certain new and useful Improvements in Dies for Forming Collars; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to improvements in sectional dies for cutting blanks for collars or other like articles.

In a collar-blank the center portion, which forms the rear of a collar, is approximately straight, and in the manufacture of collars attempts have been made to utilize this peculiar outline to advantage. To this end piles of plies forming collar-blanks have been cut by a die formed in sections—that is, the central part of the collar is formed of a straight removable die having its ends abutting against the edges of end dies for the purpose of making a sectional die for various size collars. This has required careful assembling of the die-sections and is exceedingly tedious. Furthermore, a raveling is caught between the meeting ends of the dies and becomes crushed, and gradually others are crowded in, which eventually causes the dies to spread and renders them useless. Others have tried stamping the plies from which collars are made with a die made of one piece; but this mode of manufacture also possesses decided mechanical disadvantages, as well as being so expensive as to render it of little commercial value.

It is therefore the purpose and object of my invention to provide two end dies to form the ends of collar-blanks and by another operation complete the cutting of the center of the blank. This insures the entire severing of the fabric and readily permits the dies being utilized to produce collar-blanks of varying length sizes.

Other objects and advantages will be hereinafter referred to and be particularly pointed out in the claims.

Figure 4:
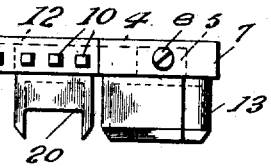
Figure 5:
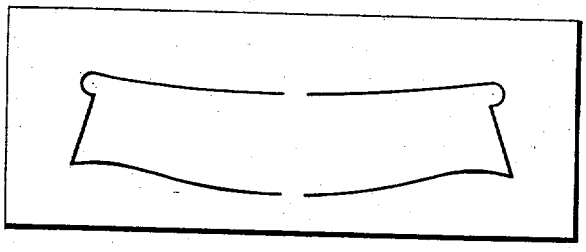
Figure 6:
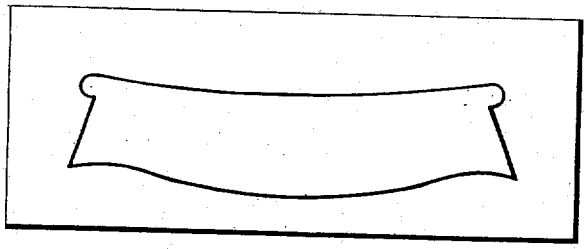
Figure 7:
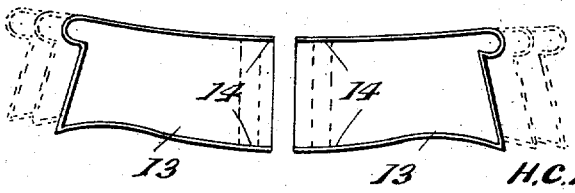

In the drawings—Figure 1 is a view of a conventional press in dotted lines, showing my improved dies in place. Fig. 2 is a bottom plan view of my improved die. Fig. 3 is a similar view of the die-base. Fig. 4 is an end view of the die and base. Fig. 5 is a view of a piece of fabric in which the ends forming a collar-blank have been cut. Fig. 6 is a similar view illustrating a complete cut by the die. Fig. 7 is a plan view of the end dies in diagrammatic form and illustrating in dotted lines two adjustments for making various size collar-blanks of the same style.

The same numerals refer to like parts in all the figures.

1 indicates a press of any approved form, 2 the stationary bed-plate, and 3 the movable die-carrier. To the carrier is fastened a base 4, having a longitudinal groove 5 in its under side and a transverse groove 6, opening into the longitudinal groove 5, in an extension 12. In the ends 7 of the base and opposite the groove 6 are set-screws 8, while along one side of said base are set-screws 9. Set-screws 10 are also located in the side of the extension 12 of the base and opposite the groove 5. In the longitudinal groove are located two end dies 13, 13, to conform to the outline of collar ends, their inner abutting edges 14 being on a straight line for a short distance toward the outer ends. These dies are provided with projections which fit into the groove 5, where they are clamped by the set-screws 8 and 9. In the extension 12 is fitted a third die 20, whose cutting edges 21 are straight and parallel and are exactly the same distance apart as the edges 14 of the dies 13 13. The die 20 is held in place by the set-screws 10 and is relatively positioned to the dies 13.

In operation the pile of fabric plies are placed under the dies 13 13, and the ends of the collar-blanks are formed. These dies are withdrawn and the goods advanced in any well-known manner to be operated upon by the die 20 or other cutting means. When the die 20 is used it is depressed and completes the outline of the pile of plies, the cut made by the last die overlapping the cuts of the end dies. The die 20 is withdrawn and the pile of plies taken away.

While I have described in the operation the cut of the end dies being made first, the same satisfactory results can be obtained by first operating the intermediate die. Then again, I have stated that the pile of plies is moved. However, if necessary, the die may be moved and the fabric remain stationary;

but as neither of these steps in the operation are material to my invention it is not deemed necessary to limit the description to either. Obviously in a cutter for cutting collar-blanks, it is important that the end dies be such as to be adjustable to increase or decrease the distance between the die ends to be able to cut blanks for different lengths. For instance, as shown in Fig. 7, the full lines represent the smallest collar, while the dotted lines indicate two larger-size collars of the same pattern. To adjust the dies for a longer or shorter collar, as the case might be, the two end dies are moved to or from each other after the set-screws have been released. The movement of the dies to cut collars of specific sizes is determined by a scale 25 in the groove, said scale being the same each side a central or zero mark. The length of the collar having been determined, it is not necessary to move the intermediate die 20, inasmuch as it is long enough to overlap the cuts of the end dies, and as the inner ends of the end dies, as well as the edges of the middle die, are all in the same plane and on a straight line and as the movement of the end dies when adjusted is on a straight line obviously collars of varying lengths can be cut without the necessity of having special dies for each size collar. The scale 26 in the groove 6 is to set the die 20 relative to the dies 13 13, when adjusting the combination of dies for collars of different styles.

My invention is extremely simple and inexpensive and possesses decided merit over the prior art, since it allows of any length of a given style with one set of dies. Moreover, my invention is not necessarily limited to use in connection with the manufacture of collars, but may be operated in any analogous art.

It will be understood that for certain styles of collars of unusual length there will be several central dies; but for ordinary purposes a single central die will be quite sufficient for the purposes described, or the blanks after being cut by the end dies may be removed and cut.

What I claim as new is:—

1. A die for cutting collars or the like comprising two end dies formed with a space between them, and an intermediate die open at both ends next the inner ends of the end dies and disconnected therefrom, the said intermediate die being longer than the space between the end dies.

2. A die for cutting collars or the like comprising two end dies formed with a space between them, the adjacent edges of said dies being straight and parallel with each other, an intermediate die open at both ends next the inner ends and disconnected therefrom said intermediate die being straight and parallel with the inner ends of the end dies and longer than the space between said latter dies.

3. A die for cutting collars or the like, comprising adjustable end dies having their inner edges straight and spaced from each other, and a straight intermediate die which cuts in alinement with the edges of the end dies, the intermediate die being longer than the space between the end dies.

4. A die for cutting collars or the like, comprising end dies, means for adjusting said dies lengthwise to or from each other and having their inner ends spaced from each other, a straight intermediate die which cuts in alinement with the edges of the end dies, said straight intermediate die being longer than the space between the two end dies, and means for adjusting said die.

5. A die for cutting collars or the like comprising a base, two end dies of arbitrary outline, except at their inner ends which are straight and spaced from each other, means for adjusting the two end dies in alinement with each other, and an intermediate straight die distant from the end dies and cutting parallel with the ends of said end dies, the straight intermediate die being longer than the space between the end dies.

6. A die for cutting collars or the like comprising two end dies mounted to be adjusted to or from each other on a straight line, the outer ends of the end dies being of arbitrary outline and their inner ends being straight, the inner ends of the end dies being spaced from each other, an intermediate die whose edges are straight and the same width and shape as the inner ends of the end dies, and longer than the space between the said end dies, the said intermediate die cutting on a line with the cut of the end dies.

7. A die for cutting collars, comprising duplicate adjustable end dies, and means for supporting and operating said dies with their proximate ends in spaced relation to avoid a complete severance of the blank, in combination with a separately operated cutting means wider than the space between the end dies to complete the cutting of the blank.

8. A die for cutting collars, comprising duplicate adjustable end dies, and means for supporting and operating said dies with their proximate ends in spaced relation to avoid a complete severance of the blank, in combination with a separately operated cutting means wider than the space between the end dies to complete the cutting of the blank, said cutting means coinciding with the lines of cut of the dies and overlapping the proximate ends of said cuts.

In testimony whereof I have signed my name to this specification in the presence of two subscribing witnesses, Apr. 18, 1906.

HENRY C. MILLER.

Witnesses:
GEO. L. RICHARD,
JNO. IMIRIE.